United States Patent
Ishibashi et al.

(10) Patent No.: US 10,549,718 B2
(45) Date of Patent: Feb. 4, 2020

(54) VEHICLE WARNING DEVICE

(71) Applicant: Yazaki Corporation, Tokyo (JP)

(72) Inventors: Shuichi Ishibashi, Shizuoka (JP); Tai Inoue, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/986,069

(22) Filed: May 22, 2018

(65) Prior Publication Data

US 2018/0345903 A1 Dec. 6, 2018

(30) Foreign Application Priority Data

Jun. 1, 2017 (JP) .................. 2017-109164

(51) Int. Cl.
| | | |
|---|---|---|
| G08B 21/24 | (2006.01) | |
| B60R 22/48 | (2006.01) | |
| G08B 5/00 | (2006.01) | |

(52) U.S. Cl.
CPC ...... B60R 22/48 (2013.01); *B60R 2022/4858* (2013.01); *B60R 2022/4866* (2013.01); *G08B 5/00* (2013.01); *G08B 21/24* (2013.01)

(58) Field of Classification Search
CPC ................ B60R 2022/4858; B60R 2022/4866
See application file for complete search history.

(56) References Cited

U.S. PATENT DOCUMENTS

| | | | | |
|---|---|---|---|---|
| 6,362,734 B1 * | 3/2002 | McQuade | ............... | B60R 22/48 180/267 |
| 7,495,548 B2 * | 2/2009 | Yabashi | ................... | B60Q 3/57 340/425.5 |
| 2008/0143508 A1 * | 6/2008 | Saitoh | ..................... | B60R 22/48 340/457.1 |
| 2018/0301301 A1 * | 10/2018 | Bach | .................... | H01H 25/002 |

FOREIGN PATENT DOCUMENTS

| | | |
|---|---|---|
| JP | 09007099 A | 1/1997 |
| JP | 2015054564 A | 3/2015 |
| JP | 2016-68718 A | 5/2016 |
| JP | 6080581 B2 | 2/2017 |

OTHER PUBLICATIONS

Communication dated Jun. 4, 2019 from the Japanese Patent Office in counterpart application No. 2017-109164.

* cited by examiner

*Primary Examiner* — Brent Swarthout
(74) *Attorney, Agent, or Firm* — Sughrue Mion, PLLC

(57) ABSTRACT

A vehicle warning device includes a housing disposed at a front of a roof in a vehicle compartment, a plurality of light emitting units provided in the housing to emit warning light having directionality, a seating sensor that detects a seated state of an occupant on each of back seats in the vehicle compartment, a wearing sensor that detects a wearing state of a seat belt of each of the back seats, and an ECU that controls turning on of each of the light emitting units based on the seated state and the wearing state, and each of the light emitting units corresponds to the occupant on each of (Continued)

the back seats, and has an optical axis disposed with respect to the housing toward an eye point region ER including an eye point of the occupant on the back seat.

4 Claims, 8 Drawing Sheets

FIG.5
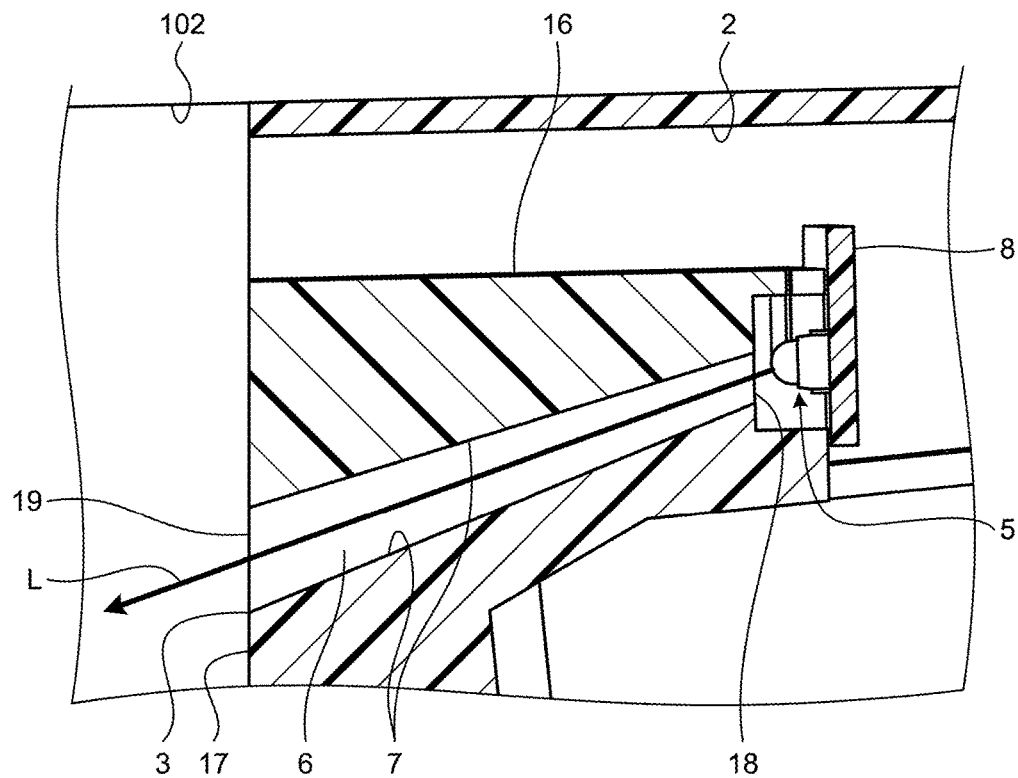
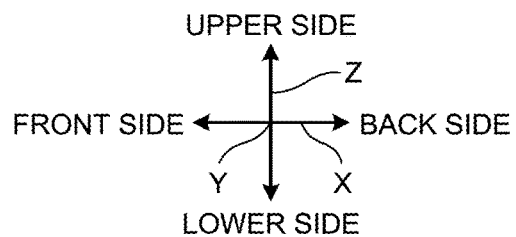

VEHICLE WARNING DEVICE

CROSS-REFERENCE TO RELATED APPLICATION(S)

The present application claims priority to and incorporates by reference the entire contents of Japanese Patent Application No. 2017-109164 filed in Japan on Jun. 1, 2017.

BACKGROUND OF THE INVENTION

1. Field of the Invention

The present invention relates to a vehicle warning device.

2. Description of the Related Art

Conventionally, there has been proposed a seat belt warning device that emits irradiation light having a band-like irradiation shape showing a warning against non-wearing of a seat belt to an occupant of a vehicle not wearing the seat belt when seating of the occupant is detected by a seating sensor, and wearing of the seat belt is not detected by a buckle switch (for example, Japanese Patent NO. 6080581).

However, in Japanese Patent NO. 6080581, a warning is given to the occupant not wearing the seat belt by emitting band-like irradiation light imitating the seat belt. However, there is room for improvement in respect of easiness of recognition by the occupant not wearing the seat belt.

SUMMARY OF THE INVENTION

A purpose of the invention is to provide a vehicle warning device capable of surely giving a warning to an occupant not wearing a seat belt.

According to one aspect of the present invention, a vehicle warning device includes a housing disposed at a front of a ceiling surface in a vehicle compartment, a plurality of light emitting units provided in the housing to emit warning light having directionality, a seating sensor that detects a seated state of an occupant on each of back seats in the vehicle compartment, a wearing sensor that detects a wearing state of a seat belt of each of the back seats, and a controller that controls turning on of each of the light emitting units based on the seated state and the wearing state. Each of the light emitting units corresponds to the occupant on each of the back seats, and has an optical axis disposed with respect to the housing toward a region including an eye point of the occupant on the back seat, and the controller turns on one of the light emitting units to an occupant on one of the back seats in a seated state and a non-wearing state, and turns off the one of the light emitting unit when the back seat is in the seated state and the non-wearing state is changed to a wearing state.

According to another aspect of the present invention, in the vehicle warning device, each of the light emitting units may include a light guide unit having an incident surface on which the warning light enters along the optical axis and an output surface from which the warning light incident from the incident surface exits, and may guide the warning light in a direction of the optical axis.

According to still another aspect of the present invention, the vehicle warning device may include a display unit provided in the housing to visually display a non-wearing state of the seat belt to the occupant seated on the back seat.

The controller may perform display and non-display of the display unit in conjunction with turning on and off of the light emitting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a partial cross-sectional view illustrating a schematic configuration of the light emitting unit of the vehicle warning device according to the embodiment;

DETAILED DESCRIPTION OF THE PREFERRED EMBODIMENTS

Hereinafter, a vehicle warning device according to an embodiment of the invention will be described in detail with reference to drawings. It should be noted that the invention is not limited by the embodiment described below. In addition, constituent elements in the embodiment below include those that can be easily replaced by those skilled in the art or those that are substantially the same.

Embodiment

Figure 1:
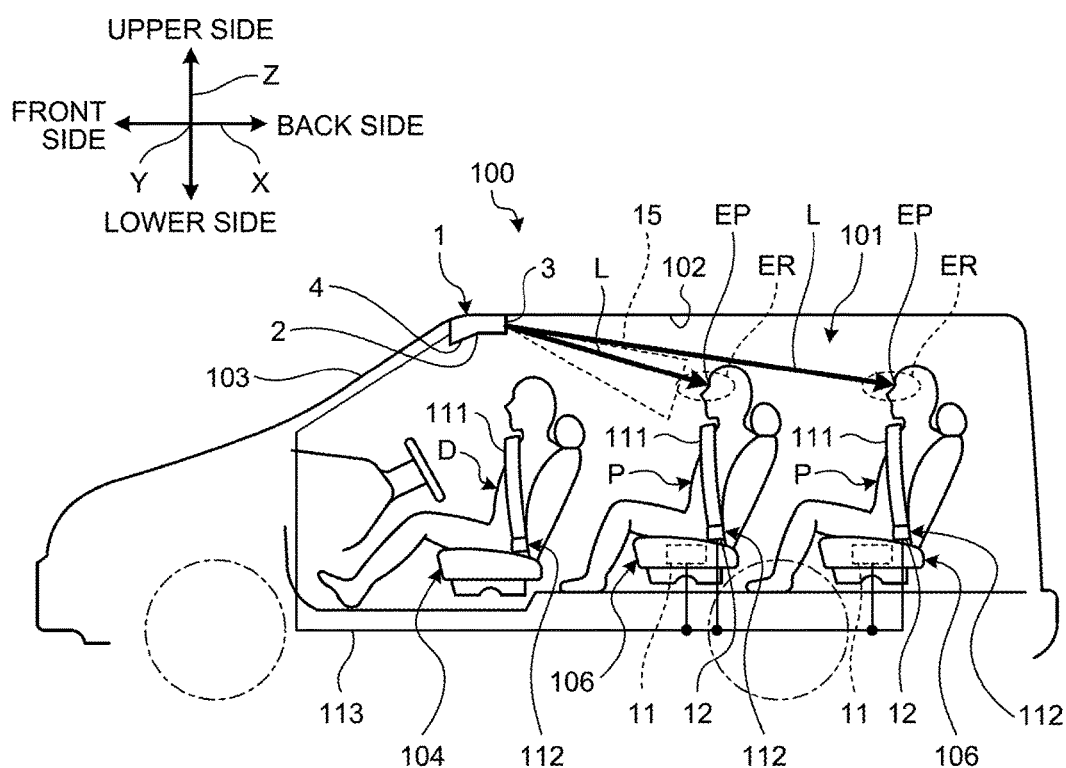
FIG. 1 is a schematic view illustrating a schematic configuration of a vehicle warning device according to an embodiment.
Figure 2:
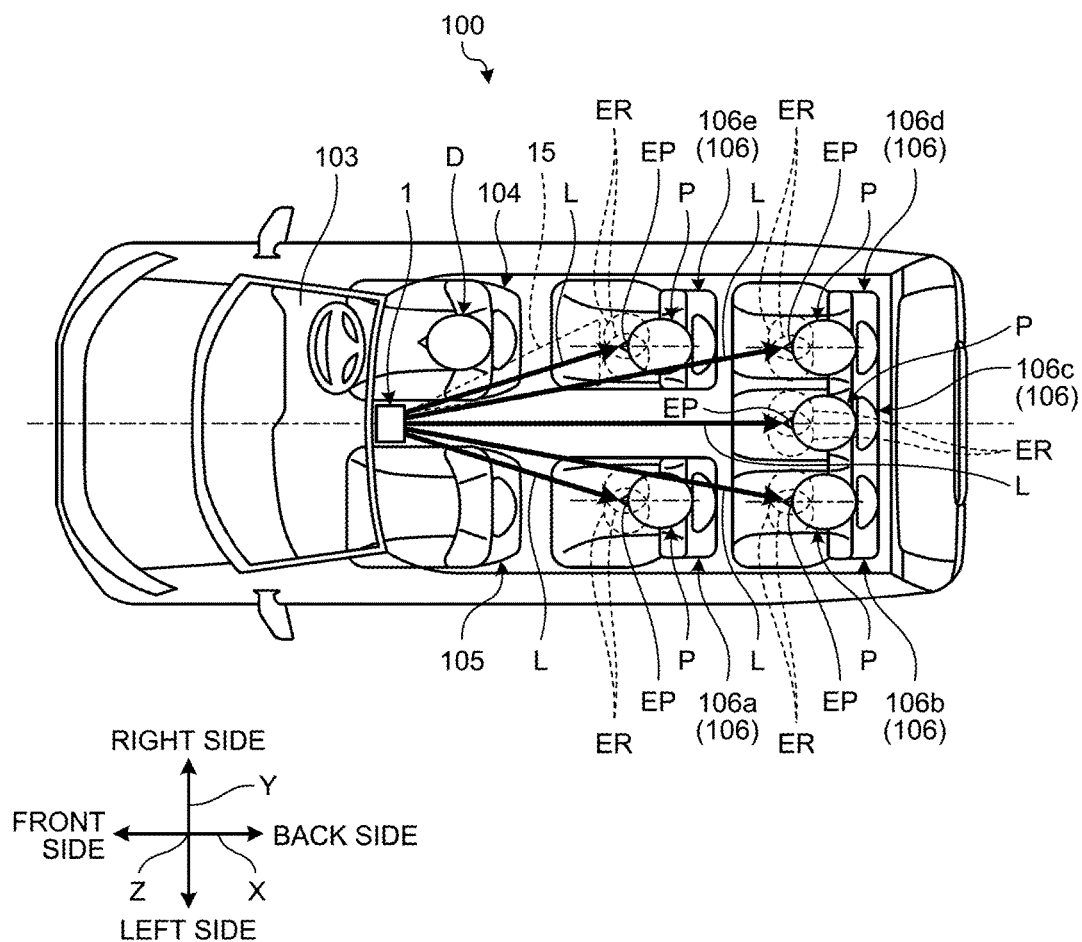
FIG. 2 is a schematic view illustrating a schematic configuration of the vehicle warning device according to the embodiment.
Figure 3:
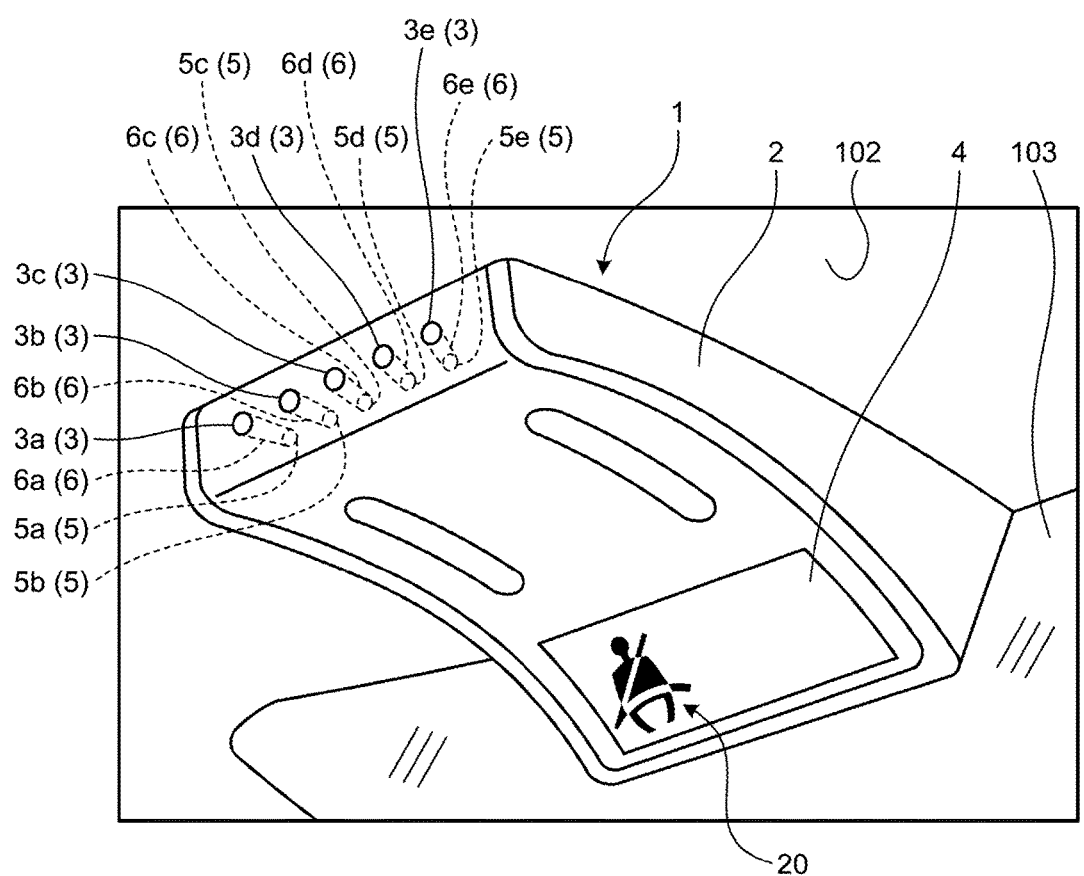
FIG. 3 is a perspective view illustrating an appearance of the vehicle warning device according to the embodiment.
Figure 4:
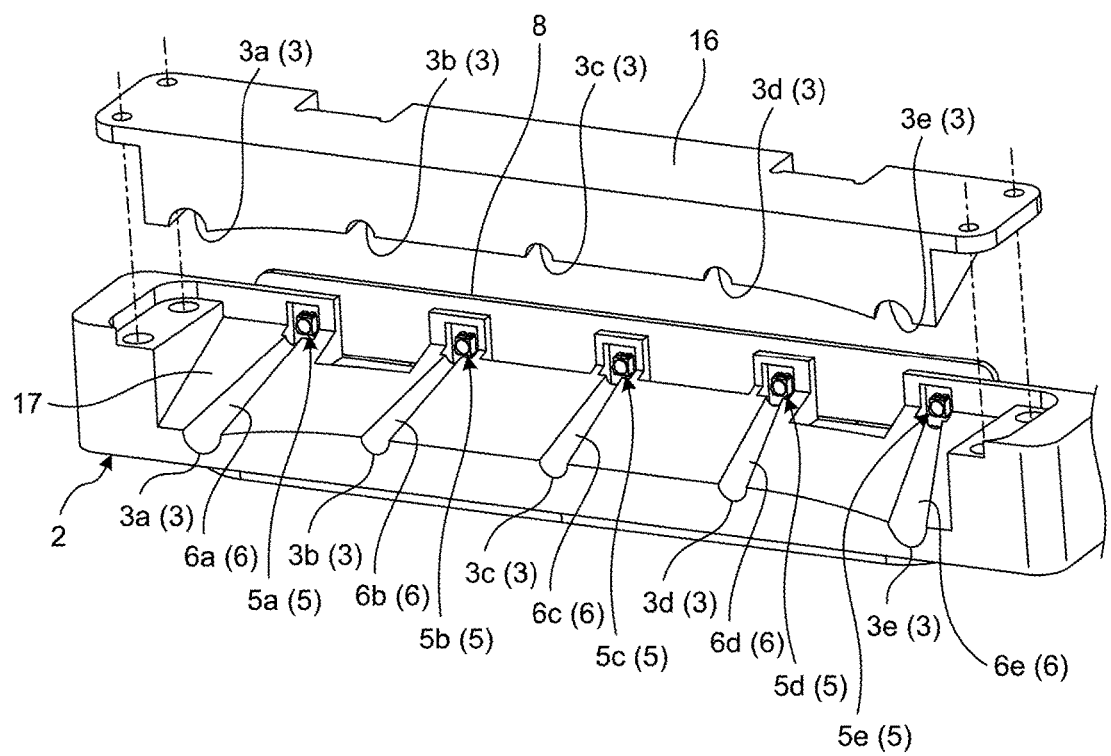
FIG. 4 is a partially exploded perspective view illustrating a schematic configuration of a light emitting unit of the vehicle warning device according to the embodiment.
Figure 6:
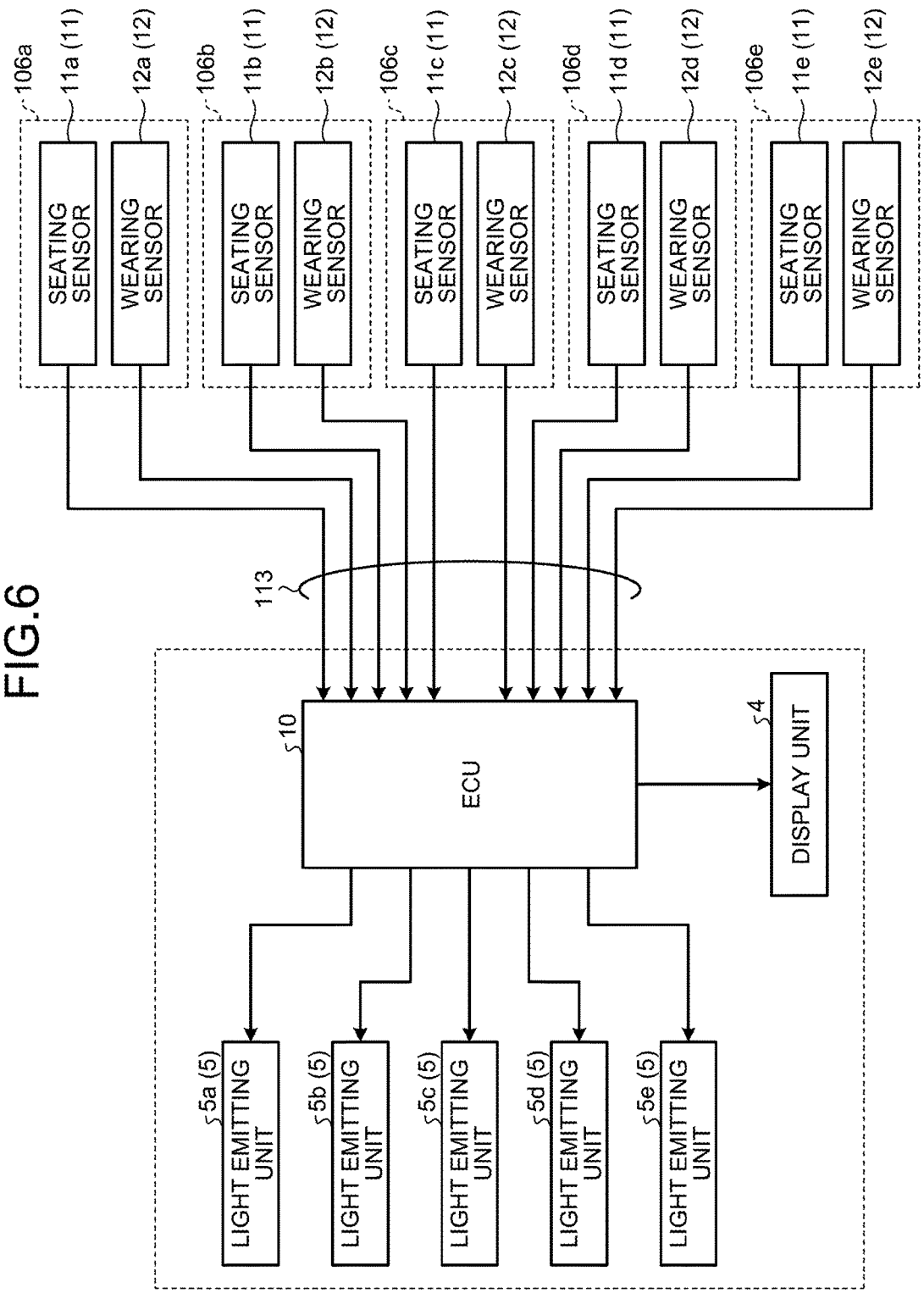
FIG. 6 is a block diagram illustrating a schematic configuration of the vehicle warning device according to the embodiment.
Figure 7:
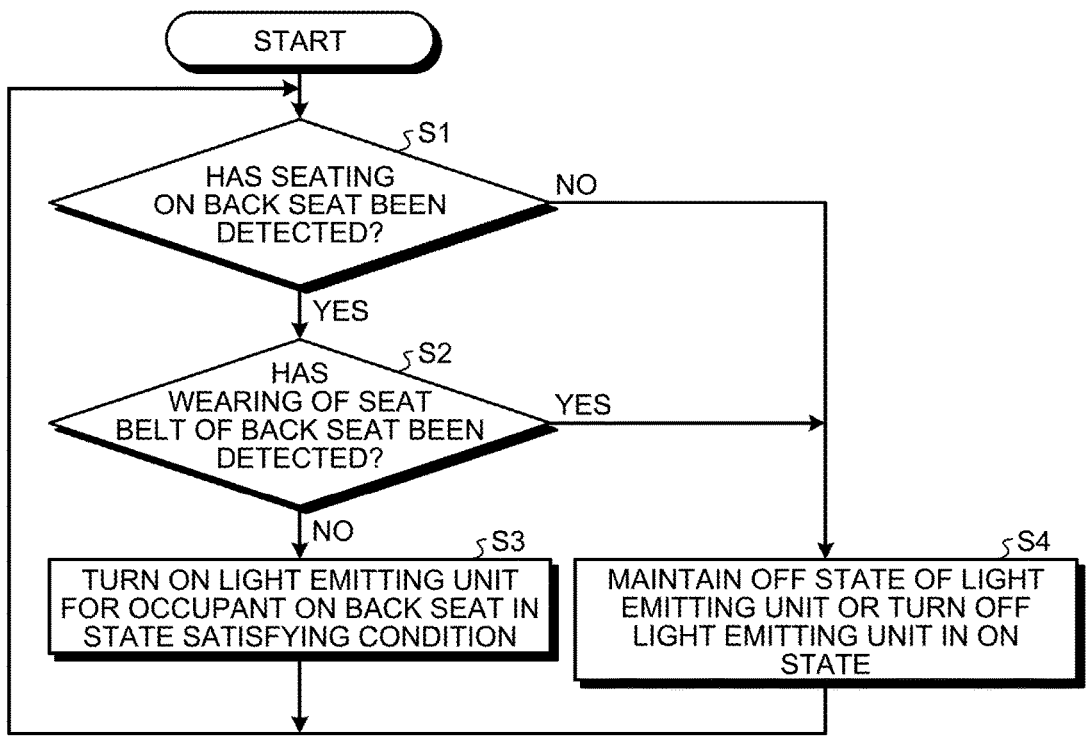
FIG. 7 is a flowchart illustrating an operation of the vehicle warning device according to the embodiment.

FIG. 1 is a schematic view illustrating a schematic configuration of a vehicle warning device according to an embodiment. FIG. 2 is a schematic view illustrating a schematic configuration of the vehicle warning device according to the embodiment. FIG. 3 is a perspective view illustrating an appearance of the vehicle warning device according to the embodiment. FIG. 4 is a partially exploded perspective view illustrating a schematic configuration of a light emitting unit of the vehicle warning device according to the embodiment. FIG. 5 is a partial cross-sectional view illustrating a schematic configuration of the light emitting unit of the vehicle warning device according to the embodiment. FIG. 6 is a block diagram illustrating a schematic configuration of the vehicle warning device according to the embodiment. FIG. 7 is a flowchart illustrating an operation of the vehicle warning device according to the embodiment. Note that FIG. 1 is a side view of a vehicle compartment of a vehicle on which the vehicle warning device is mounted, and FIG. 2 is a plan view of the vehicle compartment. FIG.

3 illustrates an example of the appearance of the vehicle warning device mounted in the vehicle compartment.

In description below, an X direction illustrated in the figures corresponds to a front-back direction of the vehicle, one side of which is set to a front side or a front and the other side of which is set to a back side or a back. A Y direction illustrated in the figures corresponds to a vehicle width direction of the vehicle orthogonal to the X direction, one side of which is set to a right side and the other side of which is set to a left side. A Z direction illustrated in the figures corresponds to a height direction of the vehicle orthogonal to the X direction and the Y direction, one side of which is set to an upper side or a top and the other side of which is set to a lower side or a bottom.

As illustrated in FIG. 1 and FIG. 2, for example, a vehicle warning device 1 according to the present embodiment is a roof module mounted on a vehicle 100 such as an automobile. The vehicle warning device 1 is disposed in a front center of a roof 102 in a vehicle compartment 101 to warn an occupant P seated on a back seat 106 and not wearing a seat belt 111 of the back seat 106.

Here, a description will be given of a schematic configuration of the vehicle 100. The vehicle 100 includes the vehicle warning device 1, the roof 102, a windshield 103, a driving seat 104, a passenger seat 105, a plurality of back seats 106 (106a, 106b, 106c, 106d, and 106e), a seat belt 111, and a seat belt buckle 112. The roof 102 is a ceiling surface covering an upper part of the vehicle compartment 101. The windshield 103 is formed from a front end of the roof 102 to extend to a front and a bottom of the vehicle 100. The driving seat 104 is a seat, on which a driver D among occupants P of the vehicle 100 is seated, and disposed on a front right side (or a front left side) of the vehicle compartment 101. The passenger seat 105 is a seat on which one of the occupants P is seated and disposed on a left side (or a right side) of the driving seat 104. The back seats 106a to 106e are seats, on which the occupants P are seated, and disposed behind the driving seat 104 and the passenger seat 105. The back seats 106a and 106e are seats in a second row following the driving seat 104 and the passenger seat 105 in a first row from the front. The back seats 106b to 106d are seats in a third row following the back seats 106a and 106e in the second row. The seat belt 111 is a belt-like safety device for restraining a body of one of the occupants P to a seat. The seat belt buckle 112 is a detaching device that fixes or releases the seat belt 111 with respect to a seat side. The vehicle 100 of the present embodiment has the back seats 106a to 106e in two rows. However, the number and shapes of the back seats are not limited thereto.

A description will be given of a physical configuration of the vehicle warning device 1 according to the present embodiment with reference to FIG. 1 to FIG. 5. As the physical configuration, the vehicle warning device 1 includes a housing 2, a plurality of openings 3 (3a, 3b, 3c, 3d, and 3e), a display unit 4, a plurality of light emitting units 5 (5a, 5b, 5c, 5d, and 5e), and a plurality of light guide units 6 (6a, 6b, 6c, 6d, and 6e).

The housing 2 is provided with the openings 3a to 3e and accommodates and holds functional parts such as the display unit 4, the light emitting units 5a to 5e, the light guide units 6a to 6e, an electronic control unit (ECU) 10 described below, etc. The housing 2 is formed in a substantially rectangular shape using a synthetic resin and is disposed at a front of the roof 102 in the vehicle compartment 101. The housing 2 is provided with the openings 3a to 3e on a back side surface. The housing 2 is provided with the display unit 4 on a front bottom surface.

The openings 3a to 3e are portions at which light L emitted from the light emitting units 5a to 5e accommodated in the housing 2 exits to the outside of the housing 2. The openings 3a to 3e are provided on the back side surface of the housing 2. The openings 3a to 3e are disposed in a row at regular intervals in the vehicle width direction. In addition, a form of an arrangement interval in the vehicle width direction of the openings 3 is not limited thereto. A planar shape of the openings 3a to 3e is a circular shape. The openings 3a to 3e are provided to correspond to the occupants P seated on the back seats 106a to 106e. That is, the opening 3a corresponds to one of the occupants P on the back seat 106a. The opening 3b corresponds to one of the occupants P on the back seat 106b. The opening 3c corresponds to the back seat 106c. The opening 3d corresponds to the back seat 106d. The opening 3e corresponds to the back seat 106e. In this way, the openings 3a to 3e are provided according to the number of occupants P seated on the back seats 106a to 106e and disposed with respect to the housing 2 toward the occupants P in a normal seated state.

The display unit 4 is provided in the housing 2 and is a part visually displaying that the occupants P seated on the back seats 106a to 106e are not wearing seat belts. For example, the display unit 4 is disposed at an angle at which at least the occupants P seated on the back seats 106a to 106e can be visually recognized with respect to a bottom surface of the housing 2. The display unit 4 has a screen large enough to be visually recognized by at least the occupants P seated on the back seats 106a to 106e. The display unit 4 is electrically connected to the ECU 10 described below to display an icon 20 illustrated in FIG. 3 according to a control signal from the ECU 10. The icon 20 includes a pattern or a symbol for allowing the occupants P to recognize that the seat belts are in the non-wearing state. For example, the display unit 4 includes a small liquid crystal display (LCD), a plurality of micro light emitting diodes (LEDs), etc.

The light emitting units 5a to 5e are provided in the housing 2 and each of the light emitting units 5a to 5e corresponds to a part emitting light L having directionality as warning light. This light L corresponds at least to simple light appealing to vision of the occupants P and corresponds to, for example, red light. Referring to the light emitting units 5a to 5e, each optical axis is disposed with respect to the housing 2 toward an eye point region ER including an eye point EP of each of the occupants P on the back seats 106a to 106e. Here, the eye point EP of each of the occupants P corresponds to a viewpoint position of each of the occupants P seated on the back seats 106a to 106e. The eye point EP represents a space between eyes (between eyebrows) of each of the occupants P. The eye point EP is preset as a point positioned in the eye point region ER. The eye point region ER is a statistical representation of a distribution of positions of both eyes of each of the occupants P seated on the back seats 106a to 106e. For example, the eye point region ER corresponds to a region including positions of both eyes of the occupants P at a predetermined ratio (for example, 95%) in a state in which the occupants P are seated on the back seats 106a to 106e. For example, the light emitting units 5a to 5e include high-brightness LEDs, etc. and are mounted on a circuit board 8. It is preferable that the light L emitted by the light emitting units 5a to 5e has brightness at which the light L is easily noticed by the occupants P. The light emitting units 5a to 5e radiate the light L from the openings 3a to 3e via the light guide units 6a to 6e.

In addition, the light emitting units 5a to 5e are provided to correspond to the occupants P seated on the back seats 106a to 106e. That is, the light emitting unit 5a corresponds to one of the occupants P on the back seat 106a. The light emitting unit 5b corresponds to one of the occupants P on the back seat 106b. The light emitting unit 5c corresponds to the back seat 106c. The light emitting unit 5d corresponds to the back seat 106d. The light emitting unit 5e corresponds to the back seat 106e. In this way, the light emitting units 5a to 5e are provided according to the number of occupants P seated on the back seats 106a to 106e and disposed with respect to the housing 2 toward the occupants P in the normal seated state.

The light guide units 6a to 6e are parts guiding the light L emitted from the light emitting units 5a to 5e in optical axis directions. The optical axis directions of the light emitting units 5a to 5e are directed to the eye points EP of the occupants P seated on the back seats 106a to 106e. That is, the light guide units 6a to 6e guide the light L from the light emitting units 5a to 5e toward the eye points EP of the occupants P seated on the back seats 106a to 106e. The light guide unit 6a guides light toward the eye point EP of the occupant P seated on the back seat 106a. The light guide unit 6b guides light toward the eye point EP of the occupant P seated on the back seat 106b. The light guide unit 6c guides light toward the eye point EP of the occupant P seated on the back seat 106c. The light guide unit 6d guides light toward the eye point EP of the occupant P seated on the back seat 106d. The light guide unit 6e guides light toward the eye point EP of the occupant P seated on the back seat 106e. In this way, the light guide units 6a to 6e are provided according to the number of the occupants P seated on the back seats 106a to 106e and disposed with respect to the housing 2 toward the occupants P in the normal seated state.

In addition, each of the light guide units 6a to 6e has an incident surface 18 on which the light L enters along each of the optical axes of the light emitting units 5a to 5e and an output surface 19 from which the light L incident from the incident surface 18 exits. Each of the light guide units 6a to 6e has a cylindrical inner peripheral surface 7 whose center corresponds to the optical axis. The inner peripheral surface 7 is formed in an inverted tapered shape so that an opening width of each of the openings 3 becomes wider from the incident surface 18 toward the output surface 19 in the optical axis direction. The inverted tapered shape of each of the light guide units 6a to 6e is formed to determine an irradiation range 15 of the light L emitted from each of the light emitting units 5a to 5e. That is, a shape of the inner peripheral surface 7 of each of the light guide units 6a to 6e is formed such that the irradiation range 15 of the light L emitted from each of the light emitting units 5a to 5e includes the eye point region ER. For example, as illustrated in FIG. 4, each of the light guide units 6a to 6e is formed by combining an upper mold member 16 and a lower mold member 17 made of a synthetic resin having a plurality of grooves in an optical axis direction of a contact surface.

Next, a description will be given of a functional configuration of the vehicle warning device 1 according to the present embodiment with reference to FIG. 6. As the functional configuration, the vehicle warning device 1 includes the ECU 10, a plurality of seating sensors 11 (11a to 11e), a plurality of wearing sensors 12 (12a to 12e), and a signal line 113.

The ECU 10 corresponds to a controller and controls turning on and off of each of the light emitting units 5a to 5e based on the seated state of each of the occupants P on the back seats 106a to 106e and a wearing state of the seat belt 111. The ECU 10 is connected to the seating sensors 11a to 11e by the signal line 113. The ECU 10 receives a seating signal from the seating sensors 11a to 11e through the signal line 113. In addition, the ECU 10 is connected to the wearing sensors 12a to 12e by the signal line 113. The ECU 10 receives a wearing signal from the wearing sensors 12a to 12e through the signal line 113. The ECU 10 performs a control operation to turn on the light emitting unit 5 corresponding to the back seat 106 when it is determined that the back seat 106 is in a seated state and the seat belt 111 is in a non-wearing state based on the received seating signal and wearing signal. In this instance, the ECU 10 performs a control operation to transmit a control signal to the display unit 4 to display the icon 20 on the display unit 4. Meanwhile, when it is determined that the back seat 106 is in the seated state and the wearing state of the seat belt 111 is changed from the non-wearing state to a wearing state based on the received seating signal and wearing signal, the ECU 10 changes a state of the light emitting unit 5 corresponding to the back seat 106 in the state from an ON state to an OFF state. In this instance, the ECU 10 changes the icon 20 displayed on the display unit 4 to non-display. The ECU 10 includes a central processing unit (CPU), a memory, various interfaces, a lighting driver for the light emitting unit 5, etc.

The seating sensors 11a to 11e are sensors that detect respective seated states of the occupants P on the back seats 106a to 106e. For example, the seating sensors 11a to 11e correspond to load sensors embedded in cushion members of the back seats 106a to 106e and detect loads applied to the load sensors. For example, the seating sensors 11a to 11e determine whether the loads applied to the load sensors exceed a threshold value, and transmit a seating signal to the ECU 10 when the loads exceed the threshold value. This threshold value is a value for determining whether the occupants P are seated.

The wearing sensors 12a to 12e are sensors that detect seat belt wearing states of the occupants P on the back seats 106a to 106e. For example, each of the wearing sensors 12a to 12e corresponds to an ON/OFF switch provided in the seat belt buckle 112 of the back seat 106. When a plate (not illustrated) of the seat belt 111 is inserted into the seat belt buckle 112 and the ON/OFF switch is turned on, the wearing sensor 12 transmits a wearing signal to the ECU 10.

The signal line 113 is an electric wire that electrically connects the ECU 10, the seating sensors 11a to 11e, and the wearing sensors 12a to 12e. For example, the signal line 113 is wired inside the roof 102, inside a side pillar (not illustrated), inside an instrument panel (not illustrated), and on a floor panel (not illustrated) from the housing 2 to the seating sensors 11a to 11e and the wearing sensors 12a to 12e.

Next, a description will be given of an operation of the vehicle warning device 1 with reference to FIG. 7. The vehicle warning device 1 starts together with start (for example, ignition ON) of the vehicle 100 and stops together with stop (for example, ignition OFF) of the vehicle 100. However, the invention is not limited thereto.

In Step S1, the ECU 10 determines whether the seating sensor 11 has detected that the occupant P has seated on the back seat 106. When a seating signal is not received from the seating sensor 11 and seating is not detected, the ECU 10 proceeds to Step S4. On the other hand, when the seating signal is received from the seating sensor 11 and seating is detected, the operation proceeds to Step S2. For example, when the seating signal is received from the seating sensor 11a of the back seat 106a, the ECU 10 determines that the back seat 106a corresponding to the seating sensor 11a is in a seated state, and proceeds to Step S2.

In Step S2, the ECU 10 determines whether the wearing sensor 12 has detected wearing of the seat belt 111 of the back seat 106 in the seated state. When a wearing signal is not received from the wearing sensor 12 and wearing of the seat belt 111 is not detected, the ECU 10 proceeds to Step S3. On the other hand, when the wearing signal is received from the wearing sensor 12 and wearing of the seat belt 111 is detected, the operation proceeds to Step S4. For example, when a wearing signal is not received from the wearing sensor 12a of the back seat 106a, the ECU 10 determines that the seat belt 111 of the back seat 106a is in the non-wearing state, and proceeds to Step S3.

In Step S3, the ECU 10 turns on the light emitting unit 5 for an occupant P on one of the back seats 106 in a state of satisfying a condition, puts the icon 20 of the display unit 4 in a display state, and returns to Step S1. As described above, the state of satisfying the condition refers to a state in which the back seat 106 is in the seated state and the seat belt 111 is in the non-wearing state. For example, the ECU 10 turns on the light emitting unit 5a for the occupant P on the back seat 106a while the back seat 106a is in the seated state and the seat belt 111 is in the non-wearing state, and puts the icon 20 of the display unit 4 in the display state.

In Step S4, the ECU 10 maintains the OFF state of the light emitting unit 5 or turns off the light emitting unit 5 in the ON state, puts the icon 20 of the display unit 4 in a non-display state, and returns to Step S1. For example, the ECU 10 turns off the light emitting unit 5a for the occupant P of the back seat 106a in the state satisfying the condition and puts the icon 20 of the display unit 4 in the non-display state.

As described above, the vehicle warning device 1 according to the present embodiment includes the housing 2 disposed at the front of the roof 102 in the vehicle compartment 101, the plurality of light emitting units 5 provided in the housing 2 to emit the warning light having directionality, the seating sensor 11 that detects the seated state of the occupant P on each of the back seats 106 in the vehicle compartment 101, the wearing sensor 12 that detects the wearing state of the seat belt 111 on each of the back seats 106, and the ECU 10 that controls turning on and off of each of the light emitting units 5 based on the seated state and the wearing state. Each of the light emitting units 5 corresponds to the occupant P on each of the back seats 106, and the optical axis is disposed with respect to the housing 2 toward the eye point region ER including the eye point EP of the occupant P on the back seat 106. The ECU 10 turns on the light emitting unit 5 with respect to the occupant P on the back seat 106 in the seated state and the non-wearing state. On the other hand, when the seat is in the seated state and the non-wearing state is changed to the wearing state, the ECU 10 turns off the light emitting unit 5.

According to the vehicle warning device 1 according to the present embodiment, it is possible to emit warning light having high directionality to the occupant P on the back seat 106 who is seated on the back seat 106 and does not wear the seat belt, and to surely warn the occupant P not wearing the seat belt. In this way, it is possible to make the occupant P not wearing the seat belt feel uncomfortable by emitting warning light having high directionality, and it becomes easy for the occupant P to take necessary action when the occupant P is allowed to recognize meaning of being irradiated with the light L. As a result, it is possible to cause the occupant P understanding meaning of the warning light to surely take the action of wearing the seat belt 111 necessary to avoid irradiation with the warning light. In addition, it is possible to expect an effect that an occupant P other than and around the occupant P irradiated with the warning light notices the warning light and prompts the occupant P not wearing the seat belt to wear the seat belt 111.

In addition, in the vehicle warning device 1 according to the present embodiment, each of the light emitting units 5 includes the light guide unit 6 having the incident surface 18 on which the warning light enters along the optical axis and the output surface 19 from which the warning light incident from the incident surface 18 exits, and guides the warning light in the optical axis direction. In this way, the light emitting unit 5 may emit light having higher directionality. In addition, it is possible to set the irradiation range 15 of the light emitting unit 5 using the light guide unit 6, and to reliably irradiate the occupant P with the warning light.

In addition, the vehicle warning device 1 according to the present embodiment further includes the display unit 4 provided in the housing 2 to visually display the non-wearing state of the seat belt 111 to the occupant P seated on the back seat 106. The ECU 10 performs display and non-display of the display unit 4 in conjunction with turning on and off of the light emitting unit 5. In this way, when the occupant P irradiated with the warning light visually recognizes the icon 20 displayed on the display unit 4 by turning eyes to the vehicle warning device 1, the occupant P may understand meaning of the warning light. Thereafter, when the occupant P is irradiated with the warning light, the occupant P may immediately understand that the seat belt 111 is not worn. In addition, the occupant P other than and around the occupant P irradiated with the warning light may notice that there is a person not wearing the seat belt 111 through the icon 20 displayed on the display unit 4 and prompt the person not wearing the seat belt 111 to wear the seat belt 111.

Modification

In the above embodiment, the vehicle warning device 1 has a function of turning on the light emitting units 5a to 5e such that the occupant P on the back seat 106 in the state of satisfying the condition is irradiated with the warning light having directionality. However, the vehicle warning device 1 may have another function. For example, the vehicle warning device 1 may have various functions such as a function of turning ON/OFF lighting in the vehicle compartment 101, a function of adjusting brightness, a function of opening and closing a sunroof, etc.

In addition, in the above embodiment, the light guide unit 6 has an internal space surrounded by the inner peripheral surface 7. However, the invention is not limited thereto, and a transparent synthetic resin may be included. In addition, the light guide unit 6 is formed by combining the upper mold member 16 and the lower mold member 17 made of the synthetic resin. However, the invention is not limited thereto, and the light guide unit 6 may be configured by assembling a cylindrical member in alignment with positions of the incident surface 18 and the output surface 19.

In addition, in the above embodiment, whether the occupant P is seated on the back seat 106 is detected using the seating sensor 11. However, instead of the seating sensor 11, an interior of the vehicle compartment 101 may be photographed using a vehicle camera installed in the vehicle warning device 1, and an image may be analyzed to detect the occupant P seated on each of the back seats 106.

In addition, in the above embodiment, the ECU 10 is electrically connected to each of the seating sensors 11a to 11e and the wearing sensors 12a to 12e by the wired signal line 113. However, the invention is not limited thereto, and the sensors may be connected through wireless communication.

Figure 8:
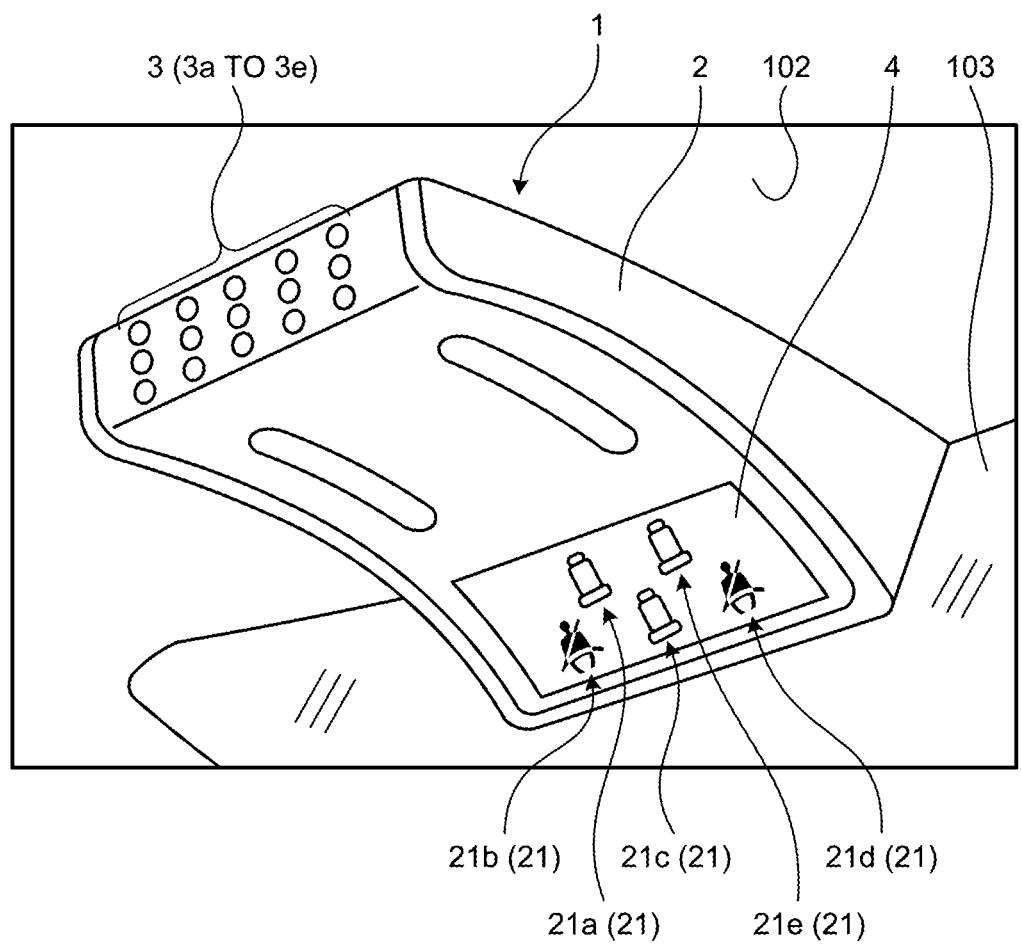
FIG. 8 is a perspective view illustrating an appearance of a vehicle warning device according to a modification of the embodiment.

In addition, in the above embodiment, the openings 3a to 3e are arranged in a row at regular intervals in the vehicle width direction. However, the invention is not limited thereto. For example, as illustrated in FIG. 8, the openings 3 may be disposed in three rows at regular intervals in the vehicle width direction. In this case, for example, three light guide units 6 may be combined with respect to one light emitting unit 5, or the light emitting units 5 may be prepared according to the number of openings 3. In this way, for example, even when the occupant P is a child and the eye point EP is shifted from the vehicle height direction, the occupant P may be accurately irradiated with the warning light. Even though three openings 3 are disposed in the vehicle height direction in the illustrated example, two openings or three or more openings may be disposed.

In addition, in the above embodiment, the display unit 4 displays the icon 20 according to the control signal of the ECU 10. However, the invention is not limited thereto. For example, as illustrated in FIG. 8, the display unit 4 may display a plurality of icons 21 (21a, 21b, 21c, 21d, and 21e) corresponding to the back seats 106a to 106e. Each of the icons 21a to 21e is configured as a pattern or a symbol for allowing recognition of the seat belt wearing state of the occupant P on each of the back seats 106a to 106e. For example, the icons 21b and 21d indicate that occupants P on the corresponding back seats 106b and 106d are in a seat belt non-wearing state. Meanwhile, the icons 21a, 21c, and 21e indicate that occupants P on the back seats 106a, 106c, and 106e are in a seat belt wearing state.

In addition, the above embodiment uses a combination of turning on of the light emitting units 5a to 5e for irradiating the occupants P on back seats 106a to 160e in the state of satisfying the condition with the warning light having directionality and displaying of the icon 20 on the display unit 4. However, only turning on of the light emitting units 5a to 5e may be used. In addition, instead of displaying the icon 20 of the display unit 4, it is possible to appeal to hearing of the occupant P. For example, an alarm sound is generated until the seat belt non-wearing state is canceled.

In addition, even though the light emitting units 5a to 5e are turned on in the above embodiment, the light emitting units 5a to 5e may flicker. In addition, even though the light emitting units 5a to 5e emit red light, the invention is not limited thereto.

In addition, in the above embodiment, in the light emitting units 5a to 5e, each optical axis is disposed with respect to the housing 2 toward the eye point region ER including the eye point EP of the occupant P on each of the back seats 106a to 106e. However, the invention is not limited thereto. For example, when there is a possibility that the warning light emitted from the light emitting units 5a to 5e may leak from a side glass or a rear glass to the outside of the vehicle, the optical axis may be disposed with respect to the housing 2 toward a part below the eye point region ER. For example, a neck or a chest of the occupant P and a portion below a belt line of the vehicle 100 are included in the part below the eye point region ER.

According to the vehicle warning device of the embodiment, it is possible to surely give a warning to an occupant not wearing a seat belt.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle warning device comprising:
   a housing disposed at a front of a ceiling surface in a vehicle compartment, the housing having a plurality of openings associated with an occupant on each of back seats in a one on one correspondence in the vehicle compartment;
   a plurality of light emitting units provided in the housing, each of the plurality of light emitting units being associated with the occupant on each of the back seats in a one on one correspondence, and the plurality of light emitting units being configured to each emit a warning light;
   a light guide unit configured to guide the warning lights to a corresponding opening of the plurality of openings;
   a seating sensor configured to detect a seated state of an occupant on each of back seats in the vehicle compartment;
   a wearing sensor configured to detect a wearing state of a seat belt of each of the back seats; and
   a controller configured to control a turning on of each of the plurality of light emitting units based on the seated state and the wearing state, wherein
   each of the plurality of light emitting units has an optical axis which faces toward a region including an eye point of the associated occupant on the back seat,
   the light guide has a cylindrical inner peripheral surface whose enter corresponds to an optical axis of a corresponding light emitting unit of the plurality of light emitting units, and gives directivity to the warning light of the corresponding light emitting unit in a direction toward the associated occupant on the back seat, and
   the controller is configured to turn on one of the plurality of light emitting units associated with an occupant on one of the back seats in a seated state and a non-wearing state, and is configured to turn off the one of the plurality of light emitting units when the back seat is in the seated state and the non-wearing state is changed to a wearing state.

2. The vehicle warning device according to claim 1, wherein
   the light guide unit includes an incident surface on which the warning light is configured to enter along the optical axis and an output surface from which the warning light incident from the incident surface is configured to exit.

3. The vehicle warning device according to claim 1, further comprising:
   a display unit provided in the housing and configured to visually display a non-wearing state of the seat belt to an occupant seated on the back seat, wherein
   the controller is configured to perform display and non-display of the display unit in conjunction with the turning on and off of the plurality of light emitting units.

4. The vehicle warning device according to claim 2, further comprising:
   a display unit provided in the housing and configured to visually display a non-wearing state of the seat belt to an occupant seated on the back seat, wherein
   the controller is configured to perform display and non-display of the display unit in conjunction with the turning on and off of the plurality of light emitting units.

* * * * *